Figure 1:
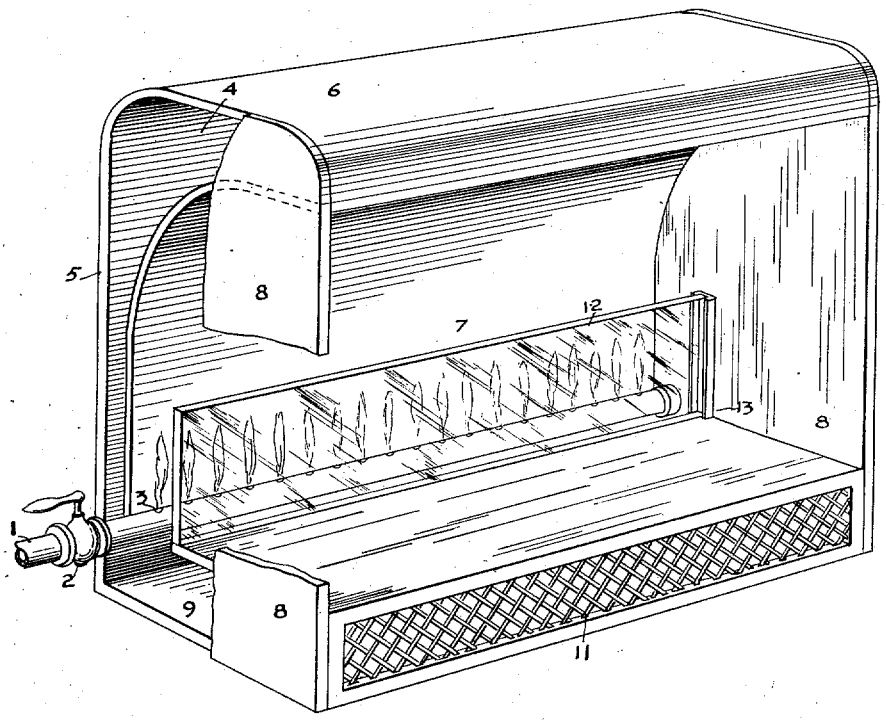

L. P. LOWE.

GAS OR VAPOR HEATER.

APPLICATION FILED MAR. 27, 1919.

Reissued June 29, 1920.

14,903.

INVENTOR
L. P. LOWE

BY F. M. Wright,

ATTY.

UNITED STATES PATENT OFFICE.

LEON P. LOWE, OF SAN FRANCISCO, CALIFORNIA.

GAS OR VAPOR HEATER.

14,903. Specification of Reissued Letters Patent. Reissued June 29, 1920.

Original No. 1,273,636, dated July 23, 1918, Serial No. 154,961, filed March 15, 1917. Application for reissue filed March 27, 1919. Serial No. 285,675.

*To all whom it may concern:*

Be it known that I, LEON P. LOWE, a citizen of the United States, residing at San Francisco, in the county of San Francisco and State of California, have invented new and useful Improvements in Gas or Vapor Heaters, of which the following is a specification.

Of the numerous attempts that have been made to devise gas stoves for heating rooms and apartments not provided with chimney flues, none has hitherto been completely satisfactory. Many gas heaters discharge the products of combustion directly into the room, to which there is no considerable objection if the gas be completely burned. Since gas, as now supplied by properly equipped utilities, is nearly always purified of sulfur and other deleterious compounds, the complete products of combustion are merely harmless carbon-dioxid and water vapor, which are the same as those exhaled by the occupants of the rooms. It is, however, well known that the combustion of gas by ordinary Bunsen or plain flame burners is seldom complete; also, if the flames from either Bunsen or plain flame burners are designedly caused to, or inadvertently allowed to, impinge upon any material from which the heat is directed or radiated into the room, then incomplete combustion is apt to, and frequently does, result. When incomplete combustion occurs, there are generated carbon-monoxid, acetylene and other objectionable and deleterious products which give rise to the well-known sickly odors, perceived in a room heated by heaters having no flue connections. To obviate the above-mentioned unpleasant odors and other ill-effects, resulting from incomplete combustion of gas, the tendency is now to provide rooms with flues for carrying off these products, with the result that a very large percentage of the heat value of the gas is wasted.

Although a plain flame burner sometimes gives complete combustion under ideal conditions, these conditions do not often obtain, and have not heretofore designedly existed in an efficient, scientifically constructed gas or vapor burning heater.

As fitted with both Bunsen and plain flame burners, the construction of heaters has hitherto generally been such that the products of combustion are discharged directly upward, but a far more efficient result is obtained by forcefully discharging the products of combustion and air heated thereby, horizontally into a room rather than vertically upward, as, in the latter case, most of the heat at once passes to the top of the room without materially benefiting the occupants.

The object of the present invention is to provide a heater in which the products of combustion will be complete, and in which all of the heat value of the fuel will be efficiently utilized, and in which the heat of combustion will be discharged horizontally into the room both by radiation and convection.

Figure 2:
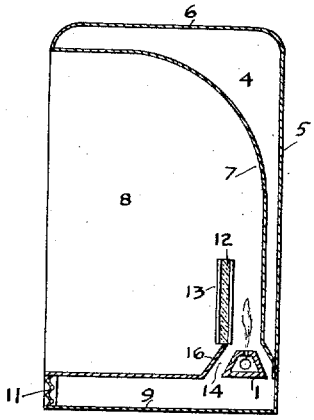
Figure 3:
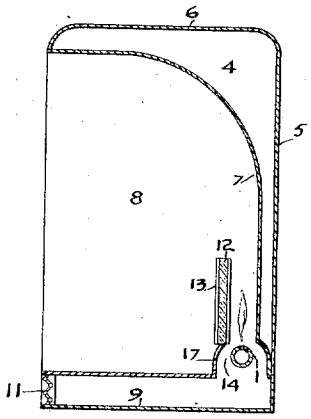

In the accompanying drawing, Figure 1 is a broken perspective view of my improved gas heater; Figs. 2 and 3 are vertical sectional views of modified forms of the invention.

Referring to the drawing: 1 indicates a gas burner, the passage of gas through which is controlled by a valve 2. In the top of said burner are a series of holes 3, forming independent gas outlets, sufficiently close to each other so that the gas issuing from all may be ignited by lighting any one of them. If desired, lava bat-wing tips may be inserted into holes in burner 1, to give broad flat flames, and tips with round holes may be used, or a single narrow slot. These variations, however, form no part of my present invention. Behind said burner is an insulating air-chamber 4 having a vertical lower portion, a horizontal upper portion, and a curved intermediate portion, this insulating chamber being for the purpose of protecting the walls of rooms or other surfaces against which the heater may be placed, and also for the purpose of causing the radiation of an increased amount of heat from the outer surface of wall 7. Walls 7 and 5 are supported by end walls 8 and the base 9.

By means of the horizontal upper portion of the front wall 7, the heat of combustion of the gas from the burners is discharged by convection into the room in a substantially horizontal direction, while the curved surface of the wall 7 projects the heat substantially horizontally by radiation.

It is well known that, while a plain flame burner can be made to give complete combustion of gas, it will not do so if the air surrounding the flame is considerably disturbed by currents, which is illustrated by the fact that there is no objection to the use of uninclosed gas flames for lighting purposes, when placed at a considerable height in a room, where they are practically unaffected because of the absence of air currents, which currents are largely caused by people moving about in the room, but uninclosed flames become objectionable if they are placed at a low level in the room where they are materially disturbed and affected by currents which are frequent at the lower level. I, therefore, protect from such air currents the flames from the burner outlets 3 by not only causing the air supplied to the gas to flow gently through the baffling interstices of the woven wire 11, or through other small openings into the base 9, but I also provide a shield 12, preferably of transparent material such as glass, in front of, close to, and of a greater height than, said flames, the ends of said plate being preferably contained in grooved holders 13, secured to, or formed in, the end walls 8 of the heater. If only to insure perfect combustion of the gas, this plate might be made of any solid incombustible material, but a transparent plate enables one to see at a glance whether, in lighting the heater, any burner has escaped being lighted. Moreover; the visible flames produce a more pleasant effect, which may be varied by using "art," or colored glass instead of plain transparent glass.

The plate 12 is also so designed and placed as to form a narrow flue which causes the heat of combustion to be ejected first upwardly, and then horizontally, with considerable force, thereby more perfectly heating the room.

In the forms of the invention shown in Figs. 2 and 3, the air passages 14, leading to the burner, are contracted, the top of the base of the heater having, in Fig. 2, a plain sloping surface 16, to conform to a gas burner of trapezoidal cross-section, and in Fig. 3 a curved surface 17, to conform to a gas burner of circular cross-section, both of the forms being of improved and scientific design.

Thus the following advantages result from my improved construction and render it a perfect and efficient gas heater.

There is a complete combustion of the gas at all times; the heat of combustion is discharged horizontally into the room by both radiation and convection; flames are visible; all heat is utilized and none allowed to waste, giving 100 per cent. efficiency; all flames can be ignited with a single movement; the position of the flames is such that it will at once be seen whether any gas has not been ignited; the conveyed heat is projected horizontally with considerable force.

It will be obvious that this heater can be made in a variety of shapes and designs, but I prefer the one shown.

By a "narrow flue" in the claims is meant one of which the walls are so close together that the air is drawn upward into the flue by the heat of the flames of the burner with such velocity that the flames of the burner are steady, as distinguished from a flue of which the walls are spaced apart so far that the combustion approximates that in an open room. This difference resembles that between a lamp chimney so narrow as to bring the air therein into intimate contact with the gaseous fuel and produce perfect combustion, and one which is too wide and in which consequently the flame is wavering and unsteady. In the latter case imperfect combustion is taking place, with the consequent injection into the room of unburnt and deleterious gases, and in the former case perfect combustion takes place with no injurious effects. This form of flue in a vapor heater of this character is believed to be novel in my invention.

This "narrow flue" possesses the additional advantage that products of combustion and heated air are forced upwardly with great velocity and are discharged forwardly into the room to a much greater distance than would otherwise be the case.

I claim:

1. A gas or vapor consuming heater comprising a burner having a linear series of fuel outlets, an air conduit leading upwardly to said outlets, a continuous vertical sheet of translucent material in front of all fuel outlets of the heater, a wall, of which a lower portion extends upwardly behind said outlets, and an upper portion extends over the top of said translucent sheet and forwardly thereof, said sheet and wall being spaced from the outlets sufficiently to form a flue discharging at its upper portion forwardly into the room, and means for removably supporting said sheet in a position in which its upper edge extends higher than the flames from the fuel burning at all of said outlets and air is prevented from passing around its lower edge and ends.

2. A gas or vapor consuming heater comprising a burner having a linear series of fuel outlets, an air conduit leading upwardly to said outlets, a translucent wall in front of all fuel outlets of the heater, a wall, of which a lower portion extends upwardly behind said outlets, and an upper portion extends over the top of said translucent wall, said walls being spaced from the outlets sufficiently to form a flue discharging at its upper portion forwardly into the room, and means for removably supporting said translucent wall in a position in which its upper edge extends higher than the flames from the fuel burning at all of said outlets and air is prevented from passing around its lower edge and ends.

L. P. LOWE.